(12) United States Patent
Cecil et al.

(10) Patent No.: US 6,340,116 B1
(45) Date of Patent: Jan. 22, 2002

(54) PROXIMITY CARD WITH INCORPORATED PIN CODE PROTECTION

(76) Inventors: Kenneth B. Cecil, 3184 Sage Glen, Escondido, CA (US) 92024; Charles A. Walton, 19115 Overlook Rd., Los Gatos, CA (US) 95030

( * ) Notice: Subject to any disclaimer, the term of this patent is extended or adjusted under 35 U.S.C. 154(b) by 0 days.

(21) Appl. No.: 09/397,269

(22) Filed: Sep. 16, 1999

(51) Int. Cl.[7] ............................................. G06K 19/06
(52) U.S. Cl. ........................ 235/492; 235/380; 235/382; 705/41
(58) Field of Search ................................. 235/492, 380, 235/382, 462.45, 462.46, 472.01, 472.02; 705/35, 39, 41, 44

(56) References Cited

U.S. PATENT DOCUMENTS

| | | | | |
|---|---|---|---|---|
| 4,800,225 A | * | 1/1989 | Imran | 235/382 |
| 5,146,068 A | * | 9/1992 | Ugawa et al. | 235/441 |
| 5,949,680 A | * | 9/1999 | Kettelkamp | 235/380 |
| 6,021,951 A | * | 2/2000 | Nishikawa | 235/494 |
| 6,036,090 A | * | 3/2000 | Rahman et al. | 235/380 |
| 6,044,349 A | * | 3/2000 | Tolopka et al. | 705/1 |
| 6,079,621 A | * | 6/2000 | Vardaniyan et al. | 235/487 |
| 6,126,077 A | * | 10/2000 | Tanaka et al. | 235/492 |
| 6,164,532 A | * | 12/2000 | Suga et al. | 235/380 |

FOREIGN PATENT DOCUMENTS

DE 19648767 * 6/1997 ............ G07F/7/10

* cited by examiner

*Primary Examiner*—Michael G. Lee
*Assistant Examiner*—Daniel St. Cyr
(74) *Attorney, Agent, or Firm*—Hoffman, Wasson & Gitler

(57) ABSTRACT

An identification card, typically of the proximity type, having on its outer structure a numeric keyboard. When approaching a high security entrance, the user enters into the card a PIN code known only to himself or a few others. The PIN code entry is compared to a reference code within the card and if correct enables the logic system of the card. When the card is next placed in proximity to a Reader antenna, a normal read occurs, that is the data of the card is transferred to the Reader. The card acts as a data source. Identification data is transferred during the read action, and also financial transactions, and an emergency code if the user is under duress and requests emergency help. The data sent to the Reader is also optionally sent to a higher order data processing system such as a central computer. In a second embodiment, the proximity circuits and antenna are made integral to a hand held palm top or lap top computer or cell phone. Thus the computer or cell phone also serves as an identification device. The security system which reads the card is also able to transfer complex data to a central point. The PIN code entry expires after a brief time interval, so that each use of the card requires re-entry of the PIN code.

36 Claims, 5 Drawing Sheets

PROXIMITY CARD WITH INCORPORATED PIN CODE PROTECTION

FIELD OF THE INVENTION

The field of the invention is that of electronic security systems, particularly those in which the user carries a credential device, usually in the form of a card, bearing identification data. The system is secure because only the authorized bearer of the card is allowed admission. More particularly, the method of card identification in the field of this invention is that known as proximity, meaning that the user need only hold the identification card near to a reader and identification is accomplished. The card need not be removed from the wallet or handbag to accomplish this identification function, provided the necessary personal identification number has been entered into the card. This invention is also in the category of security in which steps are taken to be certain that the proper person has control of the identification card, by requiring a PIN entry by the user, in which PIN stands for "personal identification number". The PIN number is known only to the authorized bearer of the card or credential device.

BACKGROUND OF THE INVENTION

A shortcoming of security systems which use a card or similar device for identification of the bearer, is that the wrong person may gain control of the card. To guard against this risk, the proper bearer is assigned a personal PIN code which must be included with the card for proper use. The phrase "PIN code" refers to a Personal Identification Number. This number is typically known only to one or a very few people. The PIN code is analogous to the personal code used to operate an Automatic Teller Machine. The PIN code is typically entered through a key pad mounted on or near the door frame.

Other inventions have introduced the concept of requiring a PIN code entry at the time of use. Some of these efforts require a keyboard mounted at the entry, thus spoiling the architecturally desirable feature of proximity systems, namely having no unwanted elements on the entry portal. These efforts are in part covered by patents listed in the second group, References 6 through 11 below. This group has the disadvantage of not being proximity and thus requiring mechanical reading equipment for accomplishing the intended use.

Reference #1, U.S. Pat. No. 4,236,068, has a keyboard on the card and has the convenience of proximity, but does not include the PIN feature. References 1 to 5 cover proximity but do not have the PIN code concept included. References 1 to 5 refer to multiple earlier patents on proximity systems, which are by now well established and known in the art. The references 1 to 5 provide ample proximity knowledge. References 6 through 11 provide patent background information on card and credential systems in which a PIN code is introduced.

REFERENCES AND PRIOR ART

Personal Identification and Signaling System Reference #1, U.S. Pat. No. 4,223,830. Shows a card with buttons and various means for modulating and demodulating identifying data, and coupling this data to a Reader and hence to a computer or communication system. This patent fails, however, to show entry of a PIN number to enable the card. FIG. 1 of Reference Patent #1 U.S. Pat. No. 4,223,830 shows the card with an included antenna, battery, crystal, and display.

|  | Number | Abbreviated Descriptive Title |
|---|---|---|
| Reference 1. | 4223830 | Identification System with Dual Data Frequencies. |
| Reference 2 | 4236068 | Personal Identification with Multiple Data Frequencies and Emergency Bits |
| Reference 3 | 4384288 | Pulse Position Modulation |
| Reference 4 | 4459474 | Direction, Differential. |
| Reference 5 | 4473825 | Power I/O, Plus |

The group of patents covered by Reference 1 to Reference 5 show various methods of coupling data from the card, via antennas on both the card and the Reader, to the Reader, and hence to computer and communication systems. This is established art and provides several means for the subject invention to accomplish the identification data transfer through the proximity coupling function. The first five have the inventor Charles Walton.

|  | Number | Abbreviated Descriptive Title |
|---|---|---|
| Reference 6 | 5559507 | Single Transmission and Tag Reading for Inductive Reader |
| Reference 7 | 5883603 | Implantable Biosensing Transponder |
| Reference 8 | 5874896 | Electronic Anti Shop Lifting System with RFID Tag |
| Reference 9 | 5847662 | Radio Card Communication Apparatus |

References 6 through 9 are other examples of proximity identification art by other inventors, but none have the added security of requiring entry of a PIN code before use, so that any unauthorized person gaining control of the card could achieve unauthorized entry.

|  | Number | Abbreviated Descriptive Title |
|---|---|---|
| Reference 10. | 4614861 | Unitary Self Contained Card Verification and Validation |
| Reference 11. | 4853522 | Access to Data Field with Multiple Services |
| Reference 12. | 4965568 | Multilevel Security with Personal Key |
| Reference 13. | 5561706 | Managing Access with a Billing Code |
| Reference 14. | 5627355 | Transaction Device Protecting Account Numbers |
| Reference 15. | 5694471 | Counterfeit-Proof Identification Card |

The patents Reference 10 through 15 show means of introducing a pin code into a hand held object such as a card, but fail to incorporate the proximity sensing feature. These patents do not solve the problem of both being easy to use, through proximity, and being secure.

SUMMARY OF THE INVENTION.

There is first a proximity reader and card, using known proximity data coupling techniques. That is, the reader stimulates the card, causing the card to cycle through its data functions, and the data stored in the card is transferred to the reader. This invention adds to the card a keyboard, or data entry means, from which a sub group of digits can be entered into the card. Within the card this sub group, also called a Personal Identification Number, or PIN, is compared to a previously stored internal reference PIN number. If the two PIN numbers agree, normal proximity data transfer is allowed to occur, and the bearer of the card is properly identified. If the internal reference PIN number and the entered PIN numbers do not agree, normal identification is denied. In other words, the bearer must have prior knowledge which establishes that he is the proper bearer of the card. The system can also be mounted in a hand held or lap top computer and the computer keyboard used to enter the PIN number. The system can also be mounted in a cell phone, and use the cell phone keyboard for entry of the PIN number, and have the proximity loop antenna built into the phone.

DESCRIPTION OF THE PREFERRED EMBODIMENT

Figure 1:
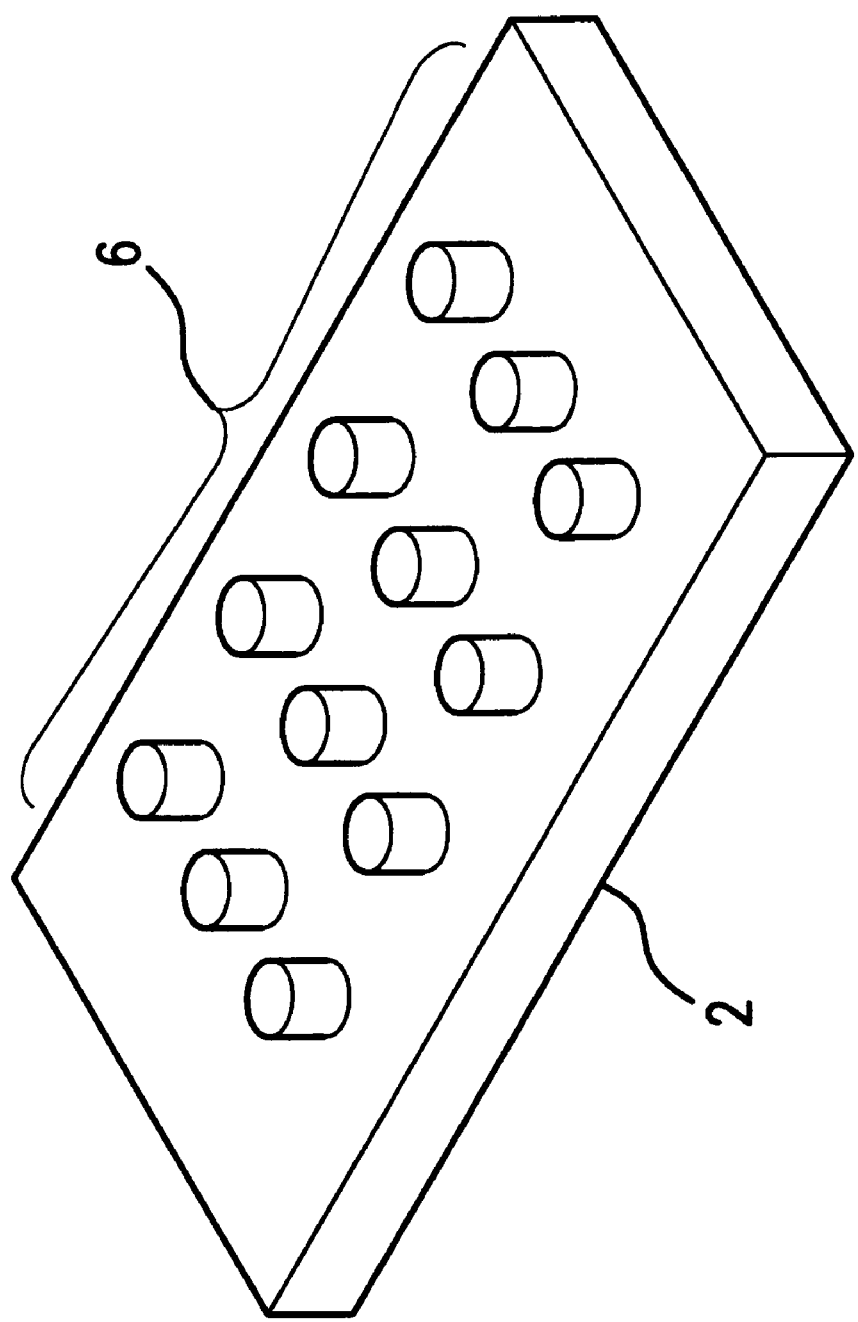
FIG. 1 shows the appearance of one form of the card, bearing a keyboard.

Refer to FIG. 1. The typical size of the identification card 2, sometimes referred to as a "credential", will be that of a conventional credit card, 9 cm by 5.5 cm. This first preferred embodiment is in the form of a card based on proximity technology. This technology allows the card to serve as a data source, or incorporate a data source, and said data is communicated first to a reader and from the reader to any higher level processor such as a central computer. The data to be transferred includes elements such as: an employee number, a unique personal identification number, an emergency number, and other stored data or keyboard data of any kind.

On the surface there is a keyboard 6, typically bearing the ten numerals, representing the first ten numbers, plus two special symbols "star" and "pound". The keyboard is typically arranged in a conventional 3 by 4 manner, as on a telephone tone dial keyboard. The keyboard plan view is further pictured in FIG. 5 as element 92.

Within the card 2 are the other requirements for a proximity card, namely a loop antenna, a logic chip, and a source of power for operating the enable/disable/sequencing functions, to be discussed. The source of power may be a small battery, or a solar cell, or the Reader 60, to be described later. If the Reader 60 provides the power, the entry of the PIN code takes place in the close proximity of the Reader 60. If a battery or solar cell, the PIN code may be entered at any distance from the Reader 60.

Figure 2:
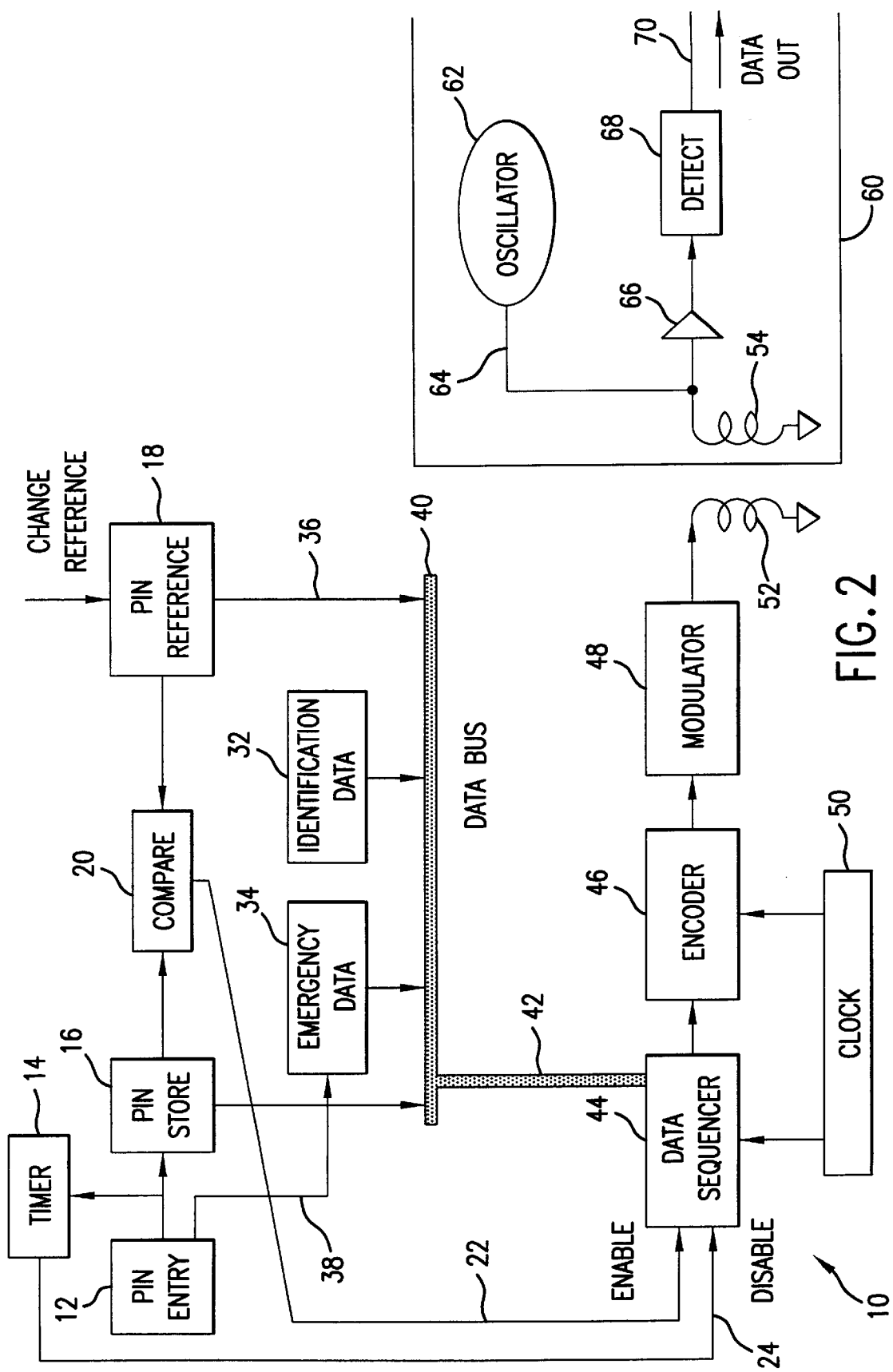
FIG. 2 shows the internal block diagram of the card.

FIG. 2 show the internal logic 10 of the card 2, and a portion of the Reader system 60. The user enters his PIN code at keyboard 6, labeled as PIN Entry 12 in FIG. 2. The letters PIN stand for Personal Identification Number. This number is known only to the user and to the security department.

The entry action initiates a timing cycle in the Timer 14, whose purpose is described later. The data entered via PIN Entry 12 is stored in PIN storage 16. Inside the card there is also a reference PIN number stored in storage 18. The reference PIN and user entered PIN are compared in Comparator 20. If there is equality of the two values, a signal is emitted on the "enable" line 22 to Data Sequencer 44. The function of the enable line 22 and Data Sequencer 44 is described later.

There are several categories of data to be transferred from the card to the Reader 60. One category is identification of the card bearer. This ID is typically the employee badge number. The identification data may also contain financial data, especially if this card 2 is also what is known as a credit or a debit card. The identification data may also contain many other factors, such as health data, biometric data, and authorization level of the user. The identification information is carried in storage unit 32.

Also desirably transferred is the PIN number itself, from PIN storage element 16. This allows the central station to verify that entry is normal. Also desirably transmitted is the reference PIN data from storage 18, for additional verification of normal function.

A special form of information is that of emergency data. The card user may be under stress, such as illegally being held by a criminal at the point of a knife or a gun. Under these circumstances, the user enters a special code as well as the normal PIN code. Emergency data stored in 34 is reported to the central system via Reader 60, by a path described later Emergency data is sent from PIN entry keyboard 12 to emergency data 34 via line 38.

All the data sources 16, 34, 32, and 18 are connected to data bus 40. Bus 40 picks up each digital value from each source and delivers it via line 42 to Data Sequencer device 44. The Data Sequencer 44 energizes one line at a time to each digit of each data source element. This technique is referred to as "serial data transfer" and is well known in the computer art and security art and is also described in the reference patents, such as References 10 through 15.

The series of digits is next encoded for single line serial transmission, which requires insertion of clocking pulses from clock 50. The mix of clock pulses and data is accomplished with clock encoder 46. The techniques of clock and data encoding are well known in the computer and data transmission art, and some versions are covered in patent References 1 through 6. A commonly used version is known as "Manchester Encoding". The result is a data stream of pulses of several widths and spacing.

The logic stream drives the modulator 48. Methods of antenna modulation are known in the art and are covered in references 1 through 6. The modulation modulates the voltage on antenna coil 52.

Card antenna coil 52 is mutually coupled to antenna 54 in Reader 60. The carrier frequency appears strongly in both coils. Fluctuations in the voltage of either appear as fluctuation in the other, though the fluctuations will be of differing amplitude. Fluctuations in the card antenna 52, produced by modulation, show up in the antenna loop 54, through the mutual coupling of loop antennas 52 and 54.

Figure 3:
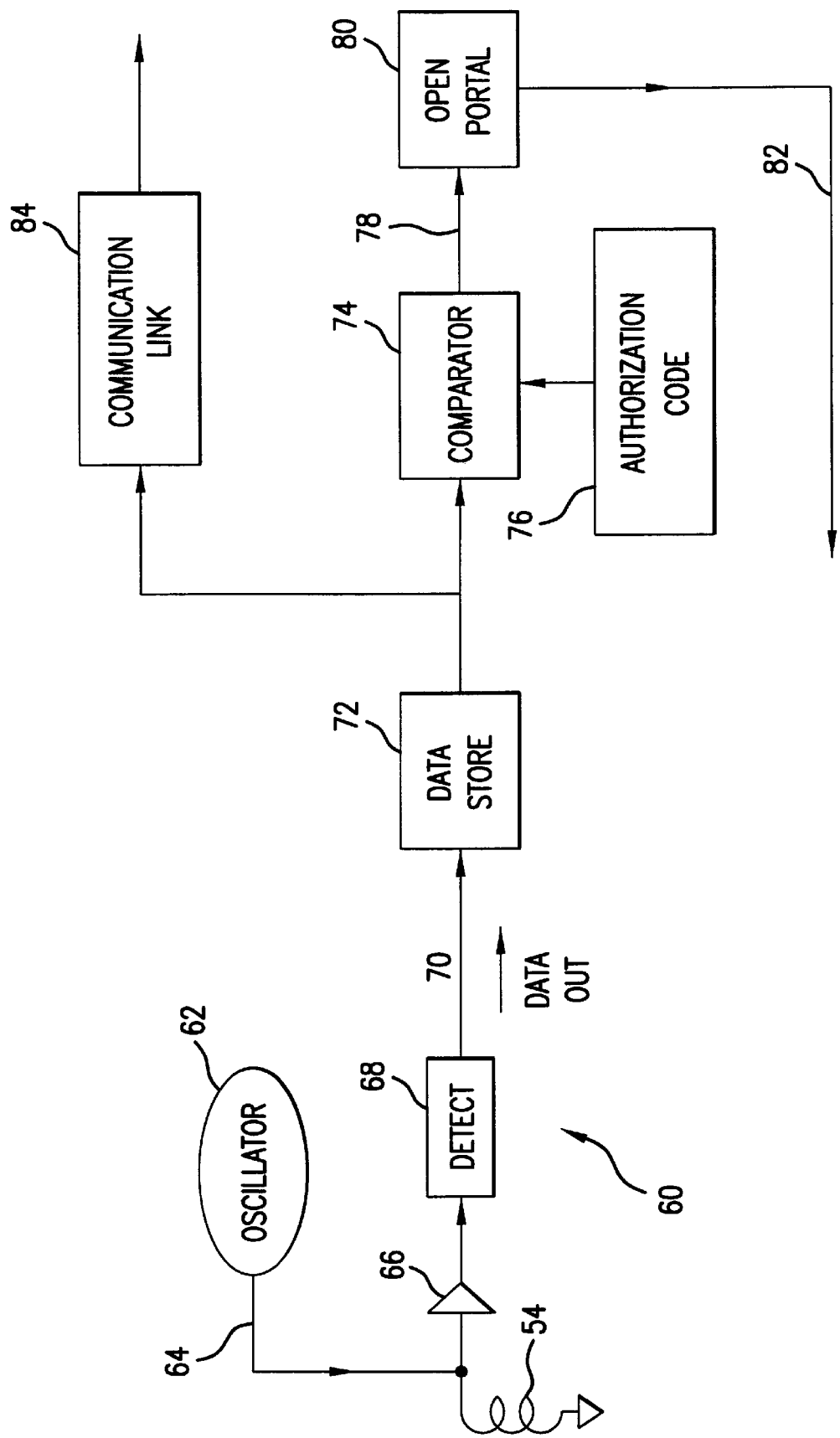
FIG. 3 shows a Reader Block Diagram.

The PIN reference is stored in storage 18. The value may be stored during manufacture, or stored on first use by the user, or may be changed at will after use. These different types of memory are known in the art. The mechanism for changing the reference PIN is not shown. It may be via the existing keyboard 6, or may be through external contacts on the card, or may be by electromagnetic insertion through a proximity coupling system Refer next to FIG. 3. This figure covers the functioning of the basic Reader 60. The Reader 60 function is covered in References 1 through 6, and in other art, but the principle points are now repeated for purposes of completeness. Oscillator 62 excites the system. Its frequency is referred to as the carrier frequency. The frequency value in many systems is between 110 and 130 kilohertz, and in another family of systems is 13.56 MHz.

Oscillator 62 drives line 64 to excite coil 54. Coil 54 is mutually coupled to coil 52 in the card. The coil 52 is repeatedly loaded and unloaded, by modulator 48, with the data intelligence, as described earlier. At the top of coil 54, which is the same as line 64, there is present both the carrier frequency and the effects of modulation. The effects of modulation are fluctuations in amplitude. The voltage is amplified by amplifier 66. The detector 68 rectifies the voltage. The act of rectification, which uses diodes and capacitors, is called signal detection. Detection removes the carrier voltage but passes the fluctuations. These fluctuation represent the data from the card. The fluctuations are amplified to the logic pulse level within detector 68, and the clock pulses are removed, in the manner described in the references, leaving a basic string of data pulses on line 70. This data is stored in data store 72.

In the basic form of the Reader, the stored data in 72 is comprised in part of the employee badge number. The employee badge number is compared in comparator 74 with the equal employee badge number stored in storage 76, also referred to as an authorization code. If the employee badge number from the data source and the stored employee number match, an authorization signal is emitted on line 78 and sent to the Open Portal drive 80. Line 82 is energized to open a door, allowing admission of the employee. If the numbers do not match an alarm is sounded indicating an unauthorized entry attempt.

In slightly more advanced systems, the data from the card 2 is first stored in 72, and then is sent through communication link 84 to a higher level computer system, not shown. This higher level computer system can make a variety of decisions, such as whether or not to ask for another reading, whether to operate an alarm, or check the time of request, and whether there is a user emergency.

Figure 5:
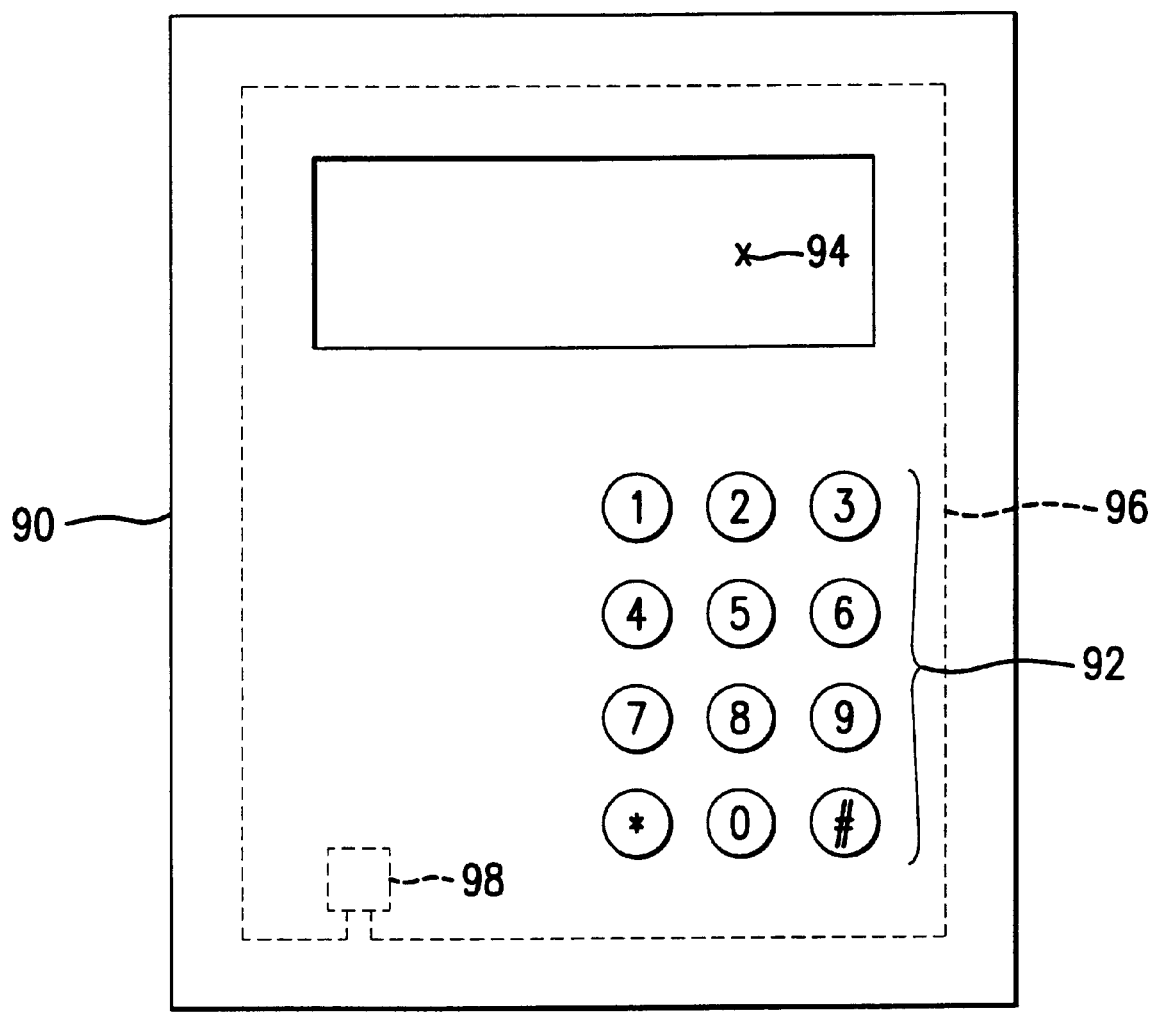
FIG. 5 shows a second view of a hand held computer incorporating PIN data transfer.

Communication link 84 is used when the palm top version, to be described in FIG. 5, sends more advanced information such as scheduling data, financial data, letters, memos, or other.

Figure 4:
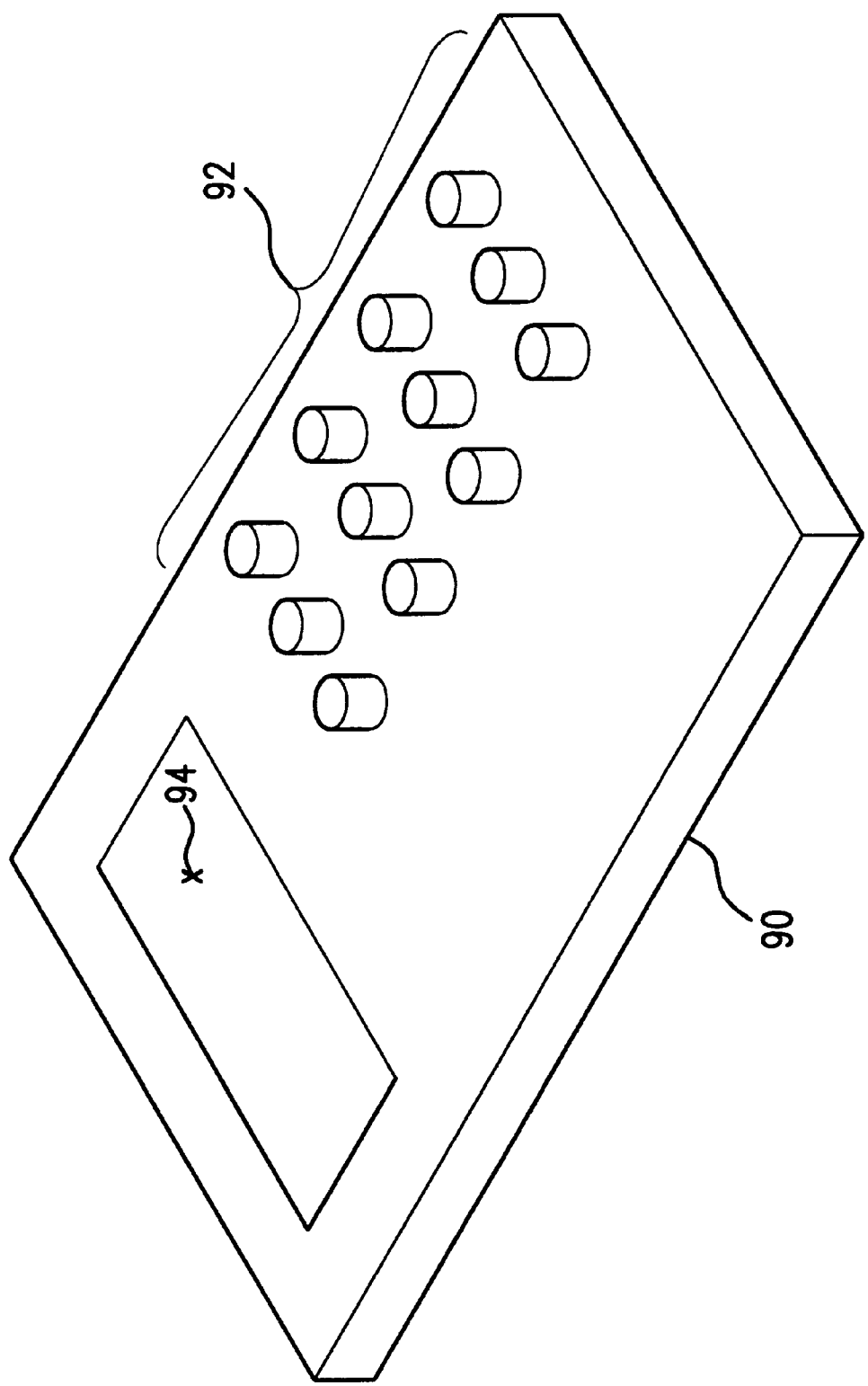
FIG. 4 shows a hand held computer incorporating PIN data transfer circuits.

FIGS. 4 and 5 display a second preferred embodiment, in the form of a hand held or lap top data processor 90, also referred to as computer 90. The hand held computer 90 is also referred to as a "Palm Top" or "Palm Pilot" computer. Hand held "Palm top" computers are useful for personal data storage and scheduling, and also for email data processing and data processing in general. Computer 90 has a keyboard 92, a display window 94, and several internal chips. The element 90 also represents a cell phone, with its keyboard, and internal battery, and incorporated antenna, although usually minus the display panel.

The circuit elements of an identification and security system, of the proximity type or of the dipole radiation type, are incorporated into the palm top computer, for an increase of function with little extra cost. Further, the hand held computer becomes a source of data for the data elements described in the first embodiment, a proximity card, plus other data such as the results of sales calls or computations.

FIG. 5 hand held computer embodiment 90 combines the technology of a Palm Top computer and the elements antenna 96 and chip 98 of a proximity identification system. The Palm top 90 has the keyboard 92. There is also the conventional palm top screen 94. When the combination 90 is placed near the proximity security system, interacting with antenna 54 of Reader 60 of FIG. 3, data is transferred from the card 90 to the communication and computer elements of the security system.

In other words, FIG. 5 shows the addition to Palm Top 90 of a sensing coil 96 and a chip 98. The chip 98 performs the modulation and data transmission functions of block 10 of FIG. 2. The PIN Entry 12 of FIG. 2 is replaced by the keyboard 92 of FIG. 4. The keyboard 92 of the palm top portion of the combination 90 is suitable for entering and verifying the PIN code. The storage elements 16, 34, 32, and 18 may be designed into the chip 98, but for economy the system would utilize the memory of Palm Top 90.

The battery which is standard in the hand held computer 90 allows powering of the logic from the battery, thus eliminating the logic power burden generally supplied by proximity coupling, and thus in turn allowing much greater range than for conventional proximity data transmission. That is, data coupling can occur through modulation of the voltage across the coil 54, yet the logic does not have to be powered by proximity coupling at the same time. Further, the battery makes possible energization of the coil 96 on FIG. 5 or the coil 54 of FIG. 3 with a conventional radio frequency oscillator, and so achieve conventional radio transmission yet greater range. When this invention is utilized in a cell phone, it carries both a dipole antenna and an inductive loop proximity antenna.

Thus the hand held palm top computer 90, or the cell phone version, serves as a proximity sensed security card 2, also referred to as a credential. It has the built in keyboard 92, equivalent to keyboard 6 in FIG. 1, and chip 98, which bears the logic functions shown in FIG. 2.

The user carries one less item. The system is secure owing to the PIN entrance requirement. Further, the user now has means for entering data into the central system utilizing security stations, which have previously been useful only for security purposes. The Reader 90 has a dual function, that of security and data collection. A population of entry stations is available without the need to set up more stations.

One other precaution is taken against accidental use by the improper person. Refer again to FIG. 2. After the PIN code is entered and stored in Pin Store 16, the card is ready for viable entry. This viable status should not last indefinitely. The Timer 14 is energized at the time of data entry and half selects (using the logic definition of half select) the Data Sequencer 44. The Timer 14 will time out after a preset interval, typically one minute, and then prevent further use of the card until a fresh PIN entry function is performed.

The card 6 may also include simple display, from an LCD or LED. In the palm top version the screen is already available. The card 6 or combination 90 may contain a speaker for automatic dialing. It may be incorporated into, or be merged with, a variety of palm held devices now on the market.

The amount of time, after a successful PIN code entry, For which the system remains enabled will be determined by the application, such as whether there is simple successful opening of a portal, or whether heavy machinery has to be started, or the quantity of people to be admitted, or the weight and size of equipment to be moved through the portal.

What is claimed is:

1. An electronic identification system for transmitting identification data from a proximity device to a reader, comprising in combination:

a data source in said proximity device;

a data receiver in said reader;

said proximity device and said reader coupled by proximity antenna means to each other;

means for entering personal identification numbers into said proximity device;

first comparison means within said proximity device to compare said personal identification numbers with first reference identification numbers stored in said proximity device;

means to enable data transmission of additional data from said proximity device to said data receiver on said comparison means showing equality in said personal identification numbers and said stored reference identification numbers; and means to inhibit data transmission if said comparison means shows inequality of said personal identification numbers and said stored reference identification numbers.

2. The electronic identification system as in claim 1 in which the said antenna means in said proximity device and data receiver are loop antennas coupled to each other by inductive coupling, whereby said loop antennas transmit information from said data source to said data receiver.

3. The electronic identification system as in claim 1 in which the said data source is identified by a proximity function.

4. The electronic identification system as in claim 1 in which the said means for entering said personal identification numbers is a data entry device integral to said data source.

5. The electronic identification system as in claim 1 in which said additional data is a general identification number including an employee badge number and further including a second comparison means in said data receiver and second reference identification numbers stored in said data receiver and wherein a successful comparison of said additional data and said second reference identification data in said data receiver results in a command to allow access to a secured location, and if unsuccessful, operates an alarm.

6. The electronic identification system as in claim 1 in which said personal identification numbers data entry includes emergency data, said emergency data being sent to an external computer and wherein said emergency data initiates actions for reporting a security emergency situation.

7. The electronic identification system as in claim 1, powered by battery.

8. The electronic identification system as in claim 1, powered by solar cell.

9. The electronic identification system as in claim 1, powered through the antenna by electromagnetic coupling and rectification and thence to the circuits of said data source.

10. The electronic identification system in accordance with claim 1, further including a timer initiated by the entry of said personal identification numbers, after a suitable period of time, said timer emitting a command which halts the functioning of said proximity device until there is a second entry of said personal identification numbers into said proximity device.

11. The electronic identification system in accordance with claim 10, wherein said suitable period of time is adjustable by the user.

12. An electronic identification system for transmitting identification data from a portable data source to a reader comprising in combination:
said portable data source having means for radio frequency data transmission from said data source to a data receiver in said reader;
means for the user to enter personal identification numbers into said portable data source;
comparison means within said data source to compare said personal identification numbers with first reference numbers stored in said data source;
means to enable data transmission of additional data if said comparator means shows equality of the said personal identification numbers and said first reference number;

means to inhibit data transmission of additional data if said comparator means shows inequality of said personal identification numbers and said first reference numbers; and said radio frequency data transmission means is by proximity coupling between said data source and said reader.

13. The electronic identification system as in claim 12 in which said means for radio frequency data transmission include antennas in said data source and said data receiver, said antennas being loop antennas coupled to each other by inductive coupling, for transmitting information from said data source to said data receiver, using proximity data coupling principles.

14. The electronic identification system as in claim 13 in which said antennas in said data source and data receiver are dipole antennas coupled to each other by electromagnetic radiation, and wherein one of said dipole antenna transmits information from said data source to said data receiver by radio frequency transmission.

15. The electronic identification system as in claim 12 in which the said means for entering said personal identification number is a data entry device integral to the said portable data source.

16. The electronic identification system as in claim 12 in which said additional data includes a general identification number, including a employee badge number and further including a comparator within said reader for comparing said additional data from said data source with a second reference number within said reader, and if comparison is successful emits an open portal command, allowing access to a secured location, and if unsuccessful operates an optional alarm, said alarm being either silent or audible.

17. The electronic identification system as in claim 12 in which said personal identification numbers also includes optional emergency data, and said emergency data being sent to an external computer, where said emergency data initiates actions for reporting a second emergency situation.

18. The electronic identification system as in claim 17 in which said optional emergency data is entered by the said user through a data entry device integral with said portable data source.

19. The electronic identification system as in claim 12 in which said personal identification numbers and said additional data contain multiple results from data processing within said data source.

20. The electronic identification system as in claim 12 incorporating means to identify whether said transmitted data is identification data or is the results of computation.

21. The electronic identification system in accordance with claim 12, further including a timer initiated by the entry of said personal identification numbers, after a suitable period of time, said timer emitting a command halting the functioning of said data source until there is a repeated entry of said personal identification numbers into said portable data source.

22. The electronic identification system in accordance with claim 21, wherein said suitable period of time is adjustable by the user.

23. The electronic identification device in accordance with claim 12, wherein said portable data source is a laptop computer.

24. The electronic identification device in accordance with claim 12, wherein said portable data source is a hand held computer.

25. The electronic identification device in accordance with claim 12, wherein said portable data source is a cell phone.

26. An electronic identification system for allowing access to protected areas, comprising:
a portable device provided with a first memory including stored first data information and stored second data information, a first comparison device and an input device for entering said first data information into said portable device;
a reader provided with a second memory including initially stored second data information and a second comparison device, said reader associated with the protected areas;
a communication device for communicating between said portable device and said reader;
wherein said first comparison device compares said first stored data information with the first data information entered by said input device, said communications device transmitting said stored second data information to said reader only if said stored first data information matches the entered first data information, and further wherein said second comparison device compares said stored second data information transmitted to said reader with said initially stored second data information, and further wherein access is allowed to the protected area only if said stored second data information transmitted from said portable device to said reader matches said initially stored second data.

27. The electronic identification system in accordance with claim 26, wherein said stored first data information and the entered first data information are personal identification numbers and said stored second data information and said initially stored second data information is an employee badge number.

28. The electronic identification system in accordance with claim 26, wherein said communication device includes a first loop antenna on said portable device and a second loop antenna on said reader, said first and second loop antennae inductively coupled to one another.

29. The electronic identification device in accordance with claim 26, wherein said input device is a keyboard or keypad.

30. The electronic identification device in accordance with claim 26, wherein said first memory includes emergency data transmitted to said reader for reporting a security emergency situation.

31. The electronic identification device in accordance with claim 26, further including a timer provided in said portable device initiated by the entry of said first data information, after a suitable period of time, said timer emitting a command which halts the functioning of said portable device until there is a second entry of the first data information into said portable device.

32. The electronic identification system in accordance with claim 31, wherein said suitable period of time is adjustable by the user.

33. An electronic identification system for transmitting identification data from a proximity device to a reader, comprising:
a data source in said proximity device;
a data receiver in said reader;
said proximity device and said reader coupled by proximity antenna means to each other;
means for entering personal identification numbers into said proximity device;
comparison means within said proximity device to compare said personal identification numbers with reference identification numbers stored in said data receiver;
means for transmitting a signal to said reader resulting from a successful comparison of said personal identification numbers with said reference identification numbers; and
a timer provided in said proximity device, said timer initiated by the entry of said personal identification numbers, after a suitable period of time, said timer emitting a command which halts the function of said proximity device until there is a second entry of said personal identification numbers into said proximity device.

34. The electronic identification system in accordance with claim 33, wherein said suitable period of time is adjustable by the user.

35. An electronic identification system for transmitting identification data from a portable data source to a reader comprising in combination:
said portable data source having means for radio frequency data transmission from said data source to a data receiver in said reader;
means for the user to enter personal identification numbers into said portable data source;
comparison means within said data source to compare said personal identification numbers with reference numbers stored in said data source;
means for transmitting a signal to said reader resulting from a successful comparison of said personal identification numbers with said reference identification numbers; and
a timer provided in said proximity device, said timer initiated by the entry of said personal identification numbers, after a suitable period of time, said timer emitting a command which halts the function of said proximity device until there is a second entry of said personal identification numbers into said proximity device.

36. The electronic identification system in accordance with claim 35, wherein said suitable period of time is adjustable by the user.

* * * * *